United States Patent [19]

Le Van et al.

[11] Patent Number: 4,555,739

[45] Date of Patent: Nov. 26, 1985

[54] SEMI SELF-LOADING FERRITE HEAD

[75] Inventors: Dien Le Van, San Jose, Calif.; Jesse T. Wallace, Rochester, Minn.

[73] Assignee: International Business Machines Corporation, Armonk, N.Y.

[21] Appl. No.: 444,767

[22] Filed: Nov. 26, 1982

[51] Int. Cl.[4] .......................... G11B 5/60; G11B 21/20
[52] U.S. Cl. ...................................... 360/103; 360/129
[58] Field of Search ......... 360/102, 103, 122, 128–129

[56] References Cited

U.S. PATENT DOCUMENTS

| | | | |
|---|---|---|---|
| 3,823,416 | 7/1974 | Warner | 360/103 |
| 4,218,715 | 8/1980 | Garnier | 360/103 |
| 4,225,891 | 9/1980 | Plotto | 360/103 |

*Primary Examiner*—John H. Wolff
*Attorney, Agent, or Firm*—Robert W. Lahtinen

[57] ABSTRACT

A semi self-loading air bearing ferrite slider assembly has a tapered leading surface portion extending from a cross rail from which side rails and a middle rail extend rearwardly. The middle rail progressively narrows to form the transducer portion where it extends across the gap between the body portion and core piece near the trailing end of the rail. Etched surfaces between the middle rail and the side rails provides subambient pressure during operation when the slider is in flight whereby the balance between the repelling air bearing surface and attraction of the subambient pressure areas supplements the stabilizing force of the load arm.

8 Claims, 3 Drawing Figures

SEMI SELF-LOADING FERRITE HEAD

BACKGROUND OF THE INVENTION

This invention is directed to slider-transducer assemblies for magnetic recording and more particularly to ferrite slider assemblies where the head and transducer gap are formed simultaneously with the air bearing surfaces and the subambient pressure surfaces of the slider.

Higher magnetic recording density requires correspondingly reduced head-to-disk spacing. This means that the slider will fly lower at a given rotational speed. The reduced fly height, combined with the trend toward thinner media coating with fewer or a total absence of wear particles and the trend toward smaller, more delicate head elements, places severe limits on the head/disk wear performance, especially during starting and stopping operations. At the same time, higher density recording at a smaller head to disk spacing requires low compliance modulation. This in turn requires the air bearing to be stiffer, which requirement is difficult to achieve in conventional air bearings unless wear requirements are disregarded and increases are made in the gram load on the suspension. In summary, to attain good wear performance, low slider-media spacing and low compliance modulation is a difficult design problem.

SUMMARY OF THE INVENTION

The slider of this invention is retained during operation in the proper attitude of flight relative to the disk partly by the subambient pressure at the slider surface and partly by the load beam. This semi self-loading ability removes the need for a head loading and unloading mechanism and thereby avoids the problems associated with the loading and unloading functions.

In constructing the slider, the same etching process that defines the air bearing surface and creates the etched areas that generate the subambient pressure also simultaneously defines the read-write head element. Thus not only must the etching technique provide the proper depth to the subambient pressure area, but also the exacting definition of the width of the transducer gap.

During start up, where compared to conventional sliders with small rails, the semi self-loading slider reaches the burnish level at one third the disk speed. This reduces to one third the contact duration and reduces to one ninth the contact distance or number of revolutions to make an important contribution to wear reduction during start-stop operations. The semi self-loading slider also has a very small change in fly height over a wide range of rotational velocity which offers the potential of increasing the recording density at the outer zones of the disk where greater tangential velocity occurs.

It is an object of the invention to provide a slider with an air bearing surface that provides quick takeoff and has reduced sensitivity to etch depth. It is also an object of the invention to provide a slider with improved compliance of the transducer with respect to the media and with a substantially constant fly height over a wide range of speed.

DETAILED DESCRIPTION

Figure 1:
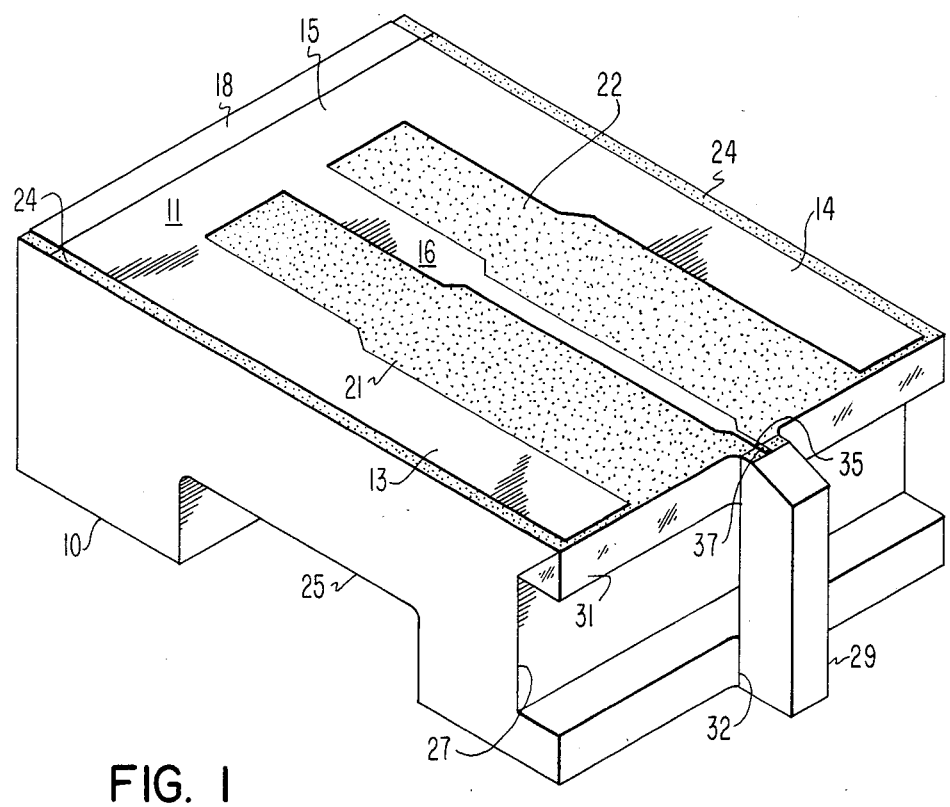
FIG. 1 is an isometric view of the self-loading, air bearing slider of this invention.
Figure 2:
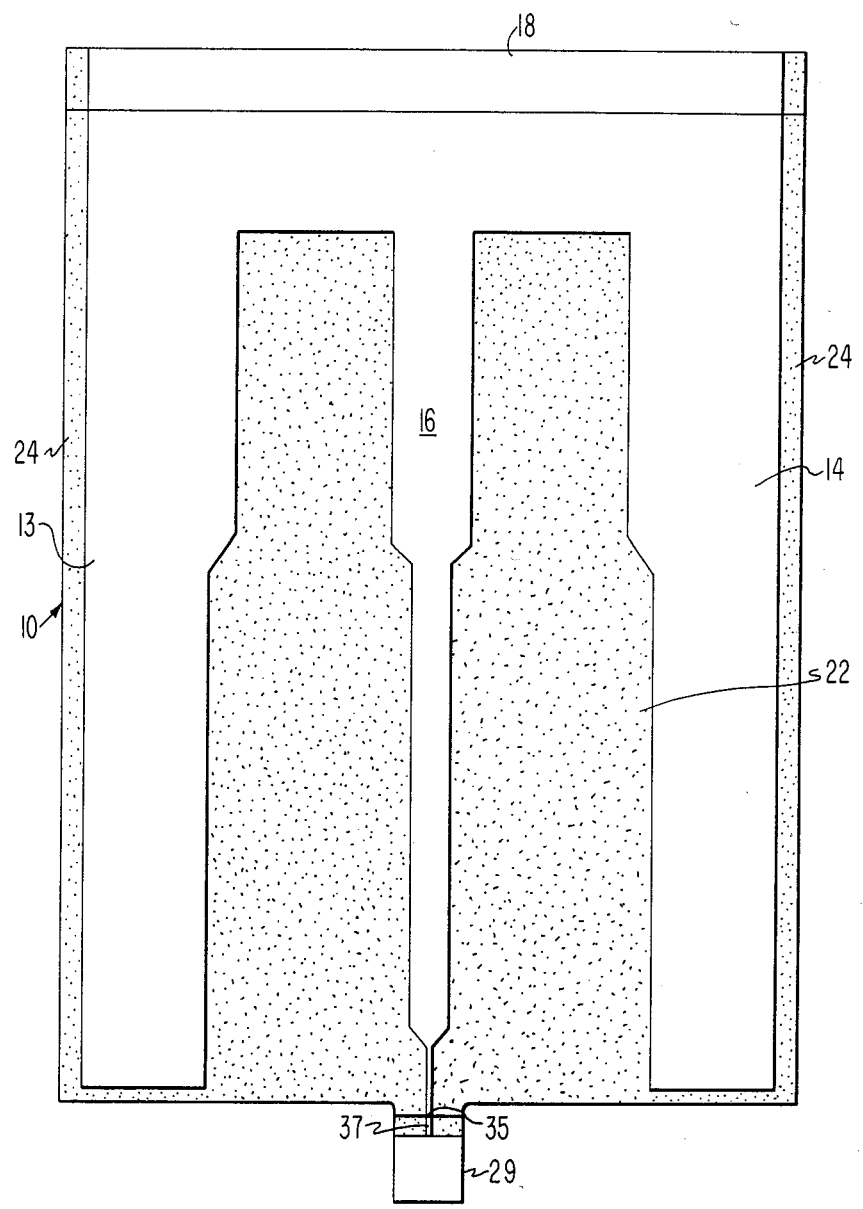
FIG. 2 is a plan view of the air bearing surface of the slider.
Figure 3:
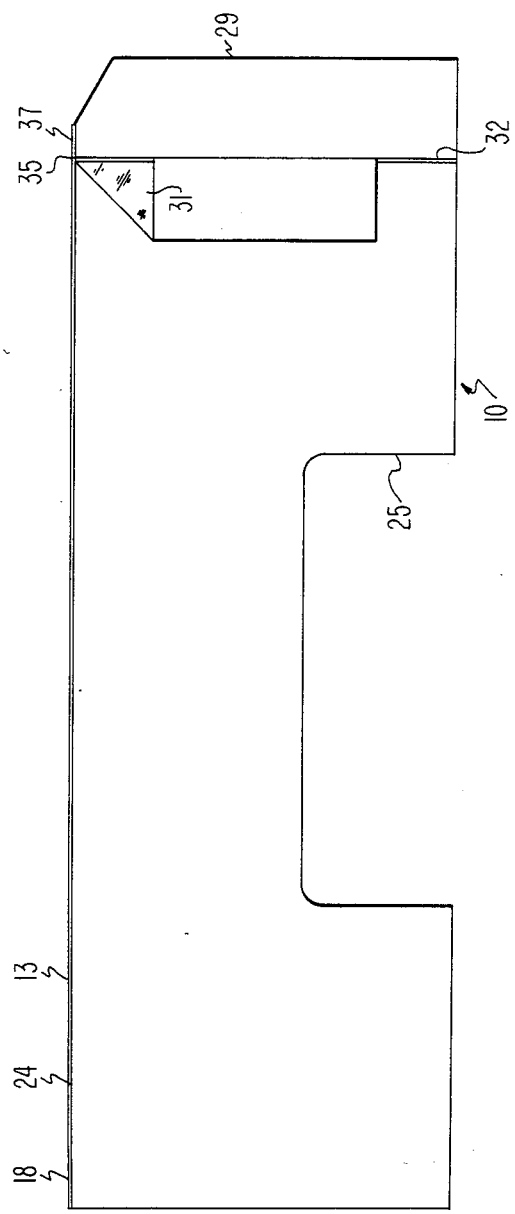
FIG. 3 is an elevation view of the slider.

As shown in FIG. 1 the slider has a ferrite body 10 that presents an air bearing surface 11. The air bearing surface 11 includes a pair of side rails 13, 14; a cross rail 15 and a middle rail 16 all of which are coplanar. Adjoining the leading edge of the slider is a tapered leading surface portion 18. This extends from the air surface defined by the common plane defined by the rail surfaces 13, 14, 15, 16 and is inclined thereto by an angle of as little as 0.4°. As shown the leading edge surface 18 is inclined to the plane of the air bearing surface 11 by an angle of approximately 0.6°.

The slider surfaces 21, 22 between the side rails 13, 14 and middle rail 16 and the marginal surfaces 24 that define the outer and trailing edges of the side rails 13, 14 are etched to a depth not exceeding 1000 microinches in and are preferably within the range of 440 to 680 microinches in depth to form recesses.

When the slider is in operation closely confronting or flying over the surface of a moving disk positive and negative or subambient pressure zones are formed to provide opposing load forces on the assembly that in cooperation with the load component supplied by the load arm are virtually counter balanced. The positive pressure occurs along the cross rail 15, the side rails 13, 14 and to a lesser extent because of its narrower dimension, the middle rail 16. The negative or subambient pressure zone occurs at the etched, recessed regions intermediate the slider surfaces 21, 22 which are side rails 13, 14 and the middle rail 16. The highest negative pressure occurs adjacent the cross rail 15 and slowly diminishes toward the trailing edge of the slider where it rapidly approaches atmospheric.

The ferrite slider body also has a transverse suspension groove 25 and a transverse groove 27 formed therein. A straight ferrite core piece 29 is secured to slider body 10 by glass 31 adjoining the front gap portion and by glass 32 at the interface with the slider body surface. The transducer coil is wound around the core piece 29 and extends into the window groove which is provided to accommodate the coil and provide access space for the winding operation during manufacture. The read/write gap 35 is formed in the trailing portions of the air bearing surface middle rail portion 37 between the rail portions formed by body 10 and core 29. Although the gap extends across the width of core piece 29, the effective working gap is limited to the width of the middle rail portion 37 at the gap location 35 at the operating frequencies of the transducer.

The slider assembly is formed with the support or body 10 having a continuous super finished surface in the planes where the air bearing rail surfaces are formed and the tapered surface 18. A mounting groove 25 is formed in the body 10 and a window groove 27 to accommodate the transducer winding. The window groove may be formed as shown with a recess 27 in the body 10 or may take the form of a C-shaped core piece bonded to a body having a planar rear wall. In either event the core piece 29 is glass bonded by glassing material 31 which both causes adhesion and forms the transducer gap 35 at the front gap and by glassing material 32 at the back gap location. The upper surface of pole piece 29 is coplanar with the body 10 superfinished surface.

During a single etching procedure, using a metal mask and photoresist processing techniques to achieve high resolution, the definition of the air bearing surface rails is determined and the subambient pressure region generated. This procedure may be conducted in accordance with reactive ion etching and masking techniques shown and described in patent application Ser. No. 357,947, filed 3/15/82 and now U.S. Pat. No. 4,375,390 and assigned to the same assignee. A thin conductive metal coating is applied to the superfinished surface. After coating the metal film with photo resist material, the taper surface 18 and air bearing rail surfaces, including the trailing narrow middle rail portion that defines the transducer gap are defined and exposed and the photo resist developed to expose the metal film in those locations where the super finished surface is to be preserved for the taper and air bearing surfaces. The exposed metal film is then plated with nickel to form a mask. Following removal of the photo resist material, the surface is reactive ion etched to form the subambient pressure areas 21, 22 and the margins 24 which adjoin and define the air bearing rail surfaces. The same etching operation, by defining the rearward narrowest portion of the middle rail 16, establishes the transducer head width. The etch depth is typically in the range of 600 to 800 microinches. The etching may selectively remove the glass material at each lateral side of the transducer gap 35 somewhat more deeply due to the greater etch rate of glass compared to the ferrite of the body 10 and core 29. This further assists in isolating the transducer action of the head to the desired gap or recording track width as desired.

During operation, when the slider assembly flies above a magnetic media surface, the semi self-loading slider maintains a more uniform height above the surface than the common taper-flat design. With less variation there is less concern about height fluctuation and the possibility of operating below the burnish height of the media surface. The air bearing pressure urges the transducer-slider away from the confronting surface while the force urging the slider toward the surface is composed of the negative pressure imparted by the etched surface region intermediate the rails and the load applied by the load arm. Since the negative pressure does not significantly vary with changes in fly height and the force applied by the load arm is substantially constant, the fact that the air bearing pressure reduces rapidly as separation between the media and air bearing surface increases causes the slider-transducer fly height to be self-regulating as established by the air bearing-/etched surface design configuration and the constant rotational speed at which the disk is driven.

While the invention has been particularly shown and described with regard to a preferred embodiment thereof, it will be understood by those skilled in the art that various changes in form and detail may be made therein without departing from the spirit and scope of the invention.

We claim:

1. An air bearing magnetic head slider assembly for supporting a transducer comprising:
    a substantially rectangular planar support having leading and trailing edges and including:
    a pair of coplanar outer rails;
    a middle rail positioned between and substantially coplanar with respect to said pair of rails;
    a cross rail interconnecting and coplanar with said pair of rails and said middle rail;
    said middle rail and said cross rail defining respectively with said pair of rails, a pair of recesses each enclosed on three sides by said rails and extending rearwardly from said cross rail to said trailing edge whereby, a negative pressure region is established at said recesses and a positive pressure region is established adjacent said rail surfaces causing said support to fly in close proximity to a confronting planar surface at a substantially constant height; and
    a transducer gap formed transversely in said middle rail adjoining said trailing edge.

2. The slider assembly of claim 1 further comprising a core piece attached to said support at the trailing edge of said support with the terminal end of said middle rail formed as a portion of said core piece and said transducer gap width is defined by said middle rail and the gap opening is the distance between said support and said core piece at the middle rail air bearing surface.

3. The slider assembly of claim 2 wherein said core piece is glass bonded to said support in front gap and back gap regions and a window is formed intermediate said front gap and back gap regions in one of said core piece and said support through which a winding about said core piece may be received.

4. The slider assembly of claim 1 further comprising a tapered surface adjacent the leading edge of said support which extends forwardly from said cross rail and is inclined with respect thereto.

5. The slider assembly of claim 4 wherein said tapered surface is inclined to the plane established by said side rails, middle rail and cross rail by an angle not exceeding one degree.

6. The air bearing magnet head slider assembly of claim 4 wherein said pair of recesses extend from said cross rail; are separated from said tapered leading surface portion by said coplanar cross rail portion and in the longitudinal direction, increase in width between said cross rail coplanar portion and said trailing edge of said support.

7. The air bearing magnetic head slider assembly of claim 6 wherein said tapered surface is inclined to said coplanar surface at an angle not exceeding one degree.

8. The air bearing magnetic head slider assembly of claim 6 wherein said pair of recesses have a depth of 200 to 1000 microinches.

* * * * *